(12) United States Patent
Kummetz et al.

(10) Patent No.: US 8,830,882 B2
(45) Date of Patent: Sep. 9, 2014

(54) REPEATER AND METHOD FOR OPERATING SUCH A REPEATER

(75) Inventors: Thomas Kummetz, Forest, VA (US); Arndt Pischke, Huisheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 445 days.

(21) Appl. No.: 13/127,908

(22) PCT Filed: Oct. 6, 2009

(86) PCT No.: PCT/EP2009/007152
§ 371 (c)(1),
(2), (4) Date: Sep. 29, 2011

(87) PCT Pub. No.: WO2010/049054
PCT Pub. Date: May 6, 2010

(65) Prior Publication Data
US 2012/0099490 A1    Apr. 26, 2012

Related U.S. Application Data

(60) Provisional application No. 61/108,693, filed on Oct. 27, 2008.

(30) Foreign Application Priority Data

Jan. 29, 2009    (EP) .................................. 09001235

(51) Int. Cl.
*H04J 3/00*    (2006.01)
*H04B 7/155*    (2006.01)
*H04W 52/02*    (2009.01)

(52) U.S. Cl.
CPC ....... *H04B 7/15535* (2013.01); *H04W 52/0225* (2013.01)
USPC .......................................... 370/280; 370/274

(58) Field of Classification Search
CPC ........... H04L 5/14; H04L 5/1423; H04L 5/16; H04L 25/22; H04Q 11/04
USPC .................................. 370/274, 277, 278, 280
See application file for complete search history.

(56) References Cited

U.S. PATENT DOCUMENTS 4,794,649 A    12/1988 Fujiwara
5,560,021 A *   9/1996 Vook et al. ..................... 713/323

(Continued)

FOREIGN PATENT DOCUMENTS

EP    1748576    1/2007
EP    2106174    9/2009

OTHER PUBLICATIONS

International Preliminary Report on Patentability, PCT/EP2009/007152, May 3, 2011.

(Continued)

*Primary Examiner* — Hassan Phillips
*Assistant Examiner* — Siren Wei
(74) *Attorney, Agent, or Firm* — Kilpatrick Townsend & Stockton LLP (57) ABSTRACT

A repeater capable of emitting as little electromagnetic radiation as possible is described. The repeater can transmit communication signals between a base station and a network terminal in a radio transmission network, such as a mobile radio network. The repeater can include a transmitter that can transmit the communication signals as a radio signal to the network terminal. The repeater can also include a sensor for detecting a switching signal and a control unit that can change the transmitter between a passive operating state and an active operating state based on the switching signal. The transmission power of the transmitter can be lower in the passive operating state than in the active operating state.

22 Claims, 2 Drawing Sheets

(56) References Cited

U.S. PATENT DOCUMENTS

| | | | |
|---|---|---|---|
| 7,024,218 B2* | 4/2006 | Bender | 455/522 |
| 2002/0028655 A1* | 3/2002 | Rosener et al. | 455/16 |
| 2002/0105935 A1* | 8/2002 | Miya | 370/342 |
| 2004/0110468 A1* | 6/2004 | Perlman | 455/13.3 |
| 2005/0128998 A1* | 6/2005 | Jelitto et al. | 370/349 |
| 2005/0174960 A1* | 8/2005 | Perlman | 370/328 |
| 2005/0185627 A1* | 8/2005 | Bolgiano et al. | 370/342 |
| 2006/0052131 A1* | 3/2006 | Ichihara | 455/552.1 |
| 2007/0037610 A1* | 2/2007 | Logan | 455/574 |
| 2007/0285308 A1* | 12/2007 | Bauregger et al. | 342/357.02 |
| 2008/0031174 A1* | 2/2008 | Saifullah et al. | 370/311 |
| 2008/0219214 A1* | 9/2008 | Chen et al. | 370/331 |

OTHER PUBLICATIONS

International Search Report, PCT/EP2009/007152, Jan. 21, 2010.
Written Opinion of the International Searching Authority, PCT/EP2009/007152, Jan. 21, 2010.

* cited by examiner

REPEATER AND METHOD FOR OPERATING SUCH A REPEATER

CROSS-REFERENCE TO RELATED APPLICATIONS

This application is a U.S. National Phase application of PCT/EP2009/007152, titled "Repeater and Method for Operating Such a Repeater," filed on Oct. 6, 2009, which claims priority to U.S. Provisional Application No. 61/108,693, titled "Repeater and Method for Operating a Receiver," filed on Oct. 27, 2008, and which is related to European Application No. 09001235.2, titled "Repeater and Method for Operating Such a Repeater," filed Jan. 29, 2009, each of which is incorporated herein by reference in its entirety.

TECHNICAL FIELD

The invention relates to a repeater for transmitting communication signals in a radio transmission network. The invention also relates to a method for operating such a repeater.

BACKGROUND

In connection with a signal transmission, a repeater is used to pick up a signal, possibly to condition it, and to transmit it again. Within the context of a mobile radio network, such a repeater is used, by way of example, to transmit a radio signal to an area which is in shadow of the radio waves, such as a building.

In this case, the repeater communicates firstly with a base station—situated outside the building—in the mobile radio network and secondly possibly with a mobile radio terminal (mobile telephone)—situated in the building. In this context, the direction of transmission from the base station to the mobile radio terminal is called the "downlink direction", while the transmission in the opposite direction from the mobile radio terminal to the base station is called the "uplink direction".

In the absence of uplink signals from the mobile radio terminals, WO 98/43371 A1 discloses the practice of putting a satellite repeater completely into a standby mode, that is to say of shutting it down in principle, for power-saving purposes.

In the downlink direction, a radio signal arriving at the repeater from the base station is usually always transmitted (having been amplified) in the building, regardless of whether the mobile radio terminal communicating with the base station is situated in the building or outside the building. If the relevant mobile radio terminal is situated outside the building, people who are in the building are therefore unnecessarily exposed to magnetic radiation coming from the repeater. In order to comply with demands for less electromagnetic radiation pollution ("electrosmog"), unnecessary radiation sources of this kind need to be eliminated as far as possible.

US 2008/0249214 A1, US 2008/0031174 A1, EP 1 748 576 A2, U.S. Pat. No. 4,794,649 A and EP 2 106 174 A2 disclose repeaters which can be switched to a power-saving mode with reduced radiated power.

A repeater, the operation of which involves as little electromagnetic radiation as possible being emitted is desirable. Specifying a method of operation with as little radiation as possible is also desirable.

SUMMARY

In some embodiments, a repeater for transmitting communication signals between a base station and network terminal in a radio transmission network, particularly a mobile radio network, is provided which comprises a transmitter which is set up to transmit the communication signals to the network terminal. In this case, the communication signals denote particular signals which are transmitted across the repeater, i.e. between the base station and the network terminal in the radio transmission network. In addition, the repeater comprises a sensor for detecting a switching signal, and also a control unit which is designed to change over the transmitter between a passive operating state and an active operating state on the basis of the switching signal. In this case, the transmission power of the transmitter is lower in the passive operating state than in the active operating state. The passive operating state particularly also includes the situation in which the transmitter is switched off, i.e. that the transmission power is reduced "to zero". By contrast, the transmission power in the active operating state is sufficiently high to transmit communication signals, such as a telephone call, without interference.

In some embodiments, it is desirable for the communication signals to be radiated by the repeater or the transmitter in the active operating state, whereas radiation of the communication signals needs to be suppressed at least to some extent in the passive operating state. In this case, the switching signal denotes a constraint which is used by the control unit to decide whether the transmitter needs to be put into the active operating state or into the passive operating state. In particular, provision is made in this case for the transmitter normally to be in the passive operating state first of all and to be put into the active operating state only when a suitable switching signal is detected. The transmitter can be put into the active operating state only when required.

Since the transmission power of the transmitter can be reduced in the passive operating state in comparison with the active operating state, or conversely since the repeater can transmit at "full" transmission power only in the active operating state, certain embodiments expose people who are in the environment of the repeater to a comparatively lower electromagnetic radiation dose than when a repeater is radiating uninterrupted at full transmission power. In addition, the reduced transmission power can advantageously reduce the power consumption of the repeater.

In some embodiments, the repeater is used to transmit the communication signals to an interior, particularly a building or a means of transport. In this case, the repeater can be used as a radiation filter for the building or the means of transport, since the radio signals are transmitted to the building or the means of transport at full transmission power only in the active operating state.

In other embodiments, the repeater can be used outdoors, such as for signal transmission to a tunnel. In this case, changeover to the passive operating state is used primarily for saving power.

In a first embodiment, the repeater is in the form of a "multiband repeater" for transmitting communication signals on different frequency bands. In this case, the sensor is designed to detect a respective switching signal for each frequency band separately. The control unit can change over the transmitter between the active operating state and the passive operating state on the basis of the respectively associated switching signal for each frequency band separately. In particular, the transmitter may comprise a dedicated transmission unit for each frequency band, which can be actuated by the control unit separately in each case.

In this context, provision is made for communication signals on an "active" frequency band to be transmitted at a transmission power which is sufficiently high for interference-free transmission, while communication signals on a "passive" frequency band are, by contrast, transmitted at (greatly) reduced transmission power. In particular, provision is made for the transmitter to be normally operated in the passive operating state for the individual frequency bands and to be put into the active operating state for the relevant frequency band.

In this embodiment, the switching signal provided can be an uplink signal which comes from a network terminal situated in the environment of the repeater and which can be used to identify the associated frequency band. For the identified frequency band, the transmitter is then operated in the active operating state, while it is—still—operated in the passive operating state for unidentified frequency bands. For example, the repeater can act as a filter for the frequency band(s) required in each case, since it is operated in the active operating state for the frequency bands when the frequency bands have been identified. This embodiment can be a comparatively easy implemented option for producing a low-radiation repeater.

Additionally or alternatively, in a second embodiment, the repeater is set up to transmit the communication signals using a time-division multiplexing method in temporally sequentially successive time slices, wherein the sensor is designed to detect a respective switching signal for individual time slices separately. In this case, the individual time slices each have specific associated network terminals. The control unit can change over the transmitter between the active operating state and the passive operating state on the basis of the respectively associated switching signal for individual time slices separately. In this case, the control unit can actuate the transmitter such that the communication signals for particular time slices are transmitted, while communication signals from other time slices—in the passive operating state—are not forwarded or are forwarded only at reduced transmission power. In particular, this can allow only the time slices which are associated with a specific network terminal to be transmitted at full transmission power. The repeater can transmit the individual time slices normally at reduced transmission power—in the passive operating state—and can transmit the time slices from specific network terminals at higher transmission power—in the active operating state—only when required. This embodiment can allow the transmission power of the repeater to be adjusted, particularly in line with demand, and can allow the radiation coming from the repeater to be reduced to a minimum.

In this context the sensor can observe the communication signals and hence to associate individual time slices with a specific network terminal. In this case, the communication signal itself can be used as a switching signal.

The sensor can detect a radio signal, particularly an uplink signal coming from a network terminal, as a switching signal.

In one embodiment, the sensor is designed to identify a "location update signal" from a network terminal as a switching signal. The "location update signal" from a network terminal can be used to establish the location of the network terminal within the radio transmission network and can be normally transmitted by every network terminal. In this case, the repeater can be put into the active operating state whenever a—switched-on—network terminal, particularly a mobile radio terminal, is in the vicinity thereof.

Additionally or alternatively, the sensor can recognize an "IMSI (International Mobile Subscriber Identity) Attach or Detach" procedure as a switching signal. Every network subscriber can have an associated IMSI number. When a network terminal is switched on, it can register with the closest base station in the respective radio transmission network using the IMSI Attach procedure, which involves the IMSI number being transmitted, among other things. It is therefore possible for the uplink signal coming from the network terminal to be used as a switching signal, on the basis of which the transmitter can be put into the active operating state. Conversely, the network terminal can deregister from the radio transmission network using the IMSI Detach procedure when switched off, so that the signals transmitted in the process are used as a switching signal for changing over to the passive operating state. In this context, the control unit can put the transmitter into the passive operating state only after deregistration of the last network terminal in its environment. The control unit can include a subunit based on an "IMSI catcher". This subunit can provide the repeater with the opportunity to masquerade as a base station and therefore to log the IMSI numbers of all the network terminals which can be reached.

In one embodiment, the sensor is based on an RSSI ("Received Signal Strength Indication") detector, which is normally used to identify the signal strength of a radio channel.

The sensor may be a decoder which is set up to detect the communication signals interchanged between the base station and the network terminal as a switching signal. The communication signals can be selectively associated with the individual network terminals, so that intelligent actuation of the transmitter is possible, which can result in particularly low radiation emission.

This embodiment can transmit data using the time-division multiplexing method. In this case, the communication data can be analysed, and individual (downlink) time slices can be associated with individual network terminals and the transmitter accordingly can be put into the active operating state only when required, for example.

In another embodiment, the sensor can be configured for detecting a light intensity. In this case, the light intensity can act as a switching signal, with brightness corresponding to the active operating state while darkness corresponds to the passive operating state.

In connection with a mobile radio network, this embodiment of the repeater can be used for bedrooms, since in this case reduced electromagnetic radiation pollution is particularly desirable. In particular, the repeater may be completely switched off—at least in terms of its transmission function—when it is dark. The control unit can be coupled to a smoke detector or to another alarm function in the building in order to allow a radio link to the mobile radio terminal in an emergency.

In connection with a repeater outdoors, the repeater can be coupled to the street lighting.

In other embodiments, the sensor is a sound sensor for detecting an audible signal, as a motion detector or as an acceleration sensor. In this context, a detected sound, a detected movement in the environment of the repeater or a detected (inherent) acceleration or movement by the repeater can be used as a switching signal which corresponds to the active operating state. Acceleration by the repeater can indicate an earthquake, for example, which means that in this case it is necessary to have a proper connection for the purpose of transmitting an emergency call via the repeater.

Particularly in connection with a mobile repeater which can be used for transmitting to a means of transport, for example a train, the sensor can be set up to detect a position (for the repeater or the associated means of transport). The position-finding can be provided by GPS (global positioning system), for example. By comparing the ascertained position/coordinates with a database, the appropriate switching signal can be associated. If a train is in a station, for example, then this position can be used as a switching signal in order to put the associated repeater or transmitter into the passive operating state. At the station, it can be assumed that the radio signals in the downlink direction are of sufficient strength even without further amplification in the train, so that it is possible for additional electromagnetic radiation pollution in the train as a result of the (mobile) repeater to be avoided. Likewise in connection with the mobile repeater, is the sensor can alternatively or additionally detect motion or acceleration by the repeater or by the associated means of transport. For this, it is possible for a "train stop" signal, which is provided via a train system, or the standstill of the wheels of the train (again at the station), for example, to be used as a switching signal for changing over to the passive operating state.

Likewise in connection with the mobile repeater, the respective switching signal can be taken as a basis not only for putting the transmitter in the downlink direction into the passive or active operating state but correspondingly also for putting a transmitter for the signals in the uplink direction into a passive or active operating state (on the basis of the same switching signal). In this case, the transmission power (in the uplink direction) in the passive operating state can be again reduced by approximately 10 to 20 dB in comparison with the active operating state, which can prevent uplink noise from the (train) repeater from reducing the sensitivity of the base station.

In some embodiments, the repeater is a "distributed antenna system" (DAS). In this case, the repeater can include a master unit and also a plurality of remote units, which each communicate with the master unit. The master unit can be connected to the base station of the radio transmission network, while the remote units can be provided for the purpose of communication with the network terminal. In particular, the individual remote units can be distributed in a building. Each of the remote units can include a respective sensor for detecting a switching signal and also a respective transmitter for transmitting the communication signals. In this case, the control unit can take the respective associated switching signal as a basis for changing over each transmitter separately between the passive operating state and the active operating state, which can allow the emission of radiation to be reduced as required in each building part separately.

Optionally, each remote unit is provided with a respective control unit for changing over the respectively associated transmitter.

Alternatively or additionally, the repeater is a "TDD repeater" that can transmit the communication signals using a "time-division duplex" method at alternate times in an uplink direction from the network terminal to the base station and in a downlink direction from the base station to the network terminal.

In some embodiments, relatively large volumes of data, such as images can be transmitted as "asymmetric data traffic,", which can include the time slices in the uplink and downlink directions being of different size on the basis of the main transmission direction. If an uplink signal from the network terminal is intended as a switching signal for the transmitter, the transmitter can be put into the active operating state only when an uplink signal is detected. To prevent the transmitter from being changed over to the passive operating state when transmission is effected only in the downlink direction over a relatively long period, and accordingly no uplink signal can be detected, the control unit can put the transmitter back into the passive operating state after changeover to the active operating state only after a prescribed, in particular variably programmable, hold time. In this case, the hold time can be chosen—particularly on the basis of a respective mobile radio standard—such that the longest possible time without an uplink signal for a data link is spanned.

In connection with data transmission at alternate times using the TDD method, the changeover to the active operating state may be no more than approximately 5% of the "burst length" of the uplink signal, i.e. the time for changeover may be no more than approximately 5% of the length of time for an uplink time slice. This can prevent signal losses when changing over from the passive operating state to the active operating state. The control unit can have, for the purpose of changing over between the active operating state and the passive operating state, a switching function which can be firstly sufficiently short or fast so as to not disrupt the downlink data traffic, but which can be secondly long or slow enough to prevent, as far as possible, the frequency spectrum of the downlink data traffic from being extended.

In some embodiments, the control unit can operate the transmitter in the passive operating state at a transmission power which is reduced by approximately 10-20 dB in comparison with the active operating state. Particularly in connection with a mobile radio network, the transmission power of the repeater in a passive operating state can then be admittedly too low for interference-free transmission of communication signals, but can be still sufficiently high for a contact signal from the base station to be able to be transmitted to the mobile radio terminal, for example. As a result, the mobile radio terminal can remain in contact with the base station and does not need to "search for" it.

In some embodiments, the control unit can operate the transmitter in the passive operating state at a transmission power which is reduced down to a minimal transmission signal, a "beacon signal", which is adequate for recognition. Again in connection with a mobile radio network, the repeater can imitate a contact signal—based on the respective mobile radio standard—from the base station at minimal transmission power, so that the mobile radio terminal appears to remain in contact with the base station. This can prevent the mobile radio terminal from having to look for the base station.

In some embodiments, a method is provided for the operation of a repeater, where the repeater can transmit communication signals from a base station to a network terminal in a radio transmission network, first to involve detection of a switching signal, on the basis of which the communication signals can be transmitted at a lower transmission power in a passive mode of operation than in an active mode of operation. In accordance with some embodiments, a respective switching signal is detected for each frequency band separately, the transmitter being operated in the passive operating state or in the active operating state on the basis of the respectively associated switching signal for each frequency band separately. In accordance another embodiment, a switching signal is detected for each time slice separately, the transmitter being operated in the passive operating state or in the active operating state on the basis of the respective switching signal for each time slice separately.

In respect of the reduced transmission power in the passive operating state, a further embodiment provides for the transmission power to be first reduced by approximately 10-20 dB in comparison with the active mode of operation in a first step. After a particular waiting time—in which no switching signal is detected—the transmission power is then reduced down to the minimal recognition signal. It may then be possible for the power consumption of the repeater again to be reduced as far as possible, since only the "reception end" of the repeater may be switched on, whereas the "transmission end" may be—almost—completely switched off.

BRIEF DESCRIPTION OF THE DRAWINGS

Exemplary embodiments are explained in more detail below with reference to a drawing, in which.

Parts and magnitudes which correspond to one another are provided with the same reference symbols in all figures.

DETAILED DESCRIPTION

Figure 1:
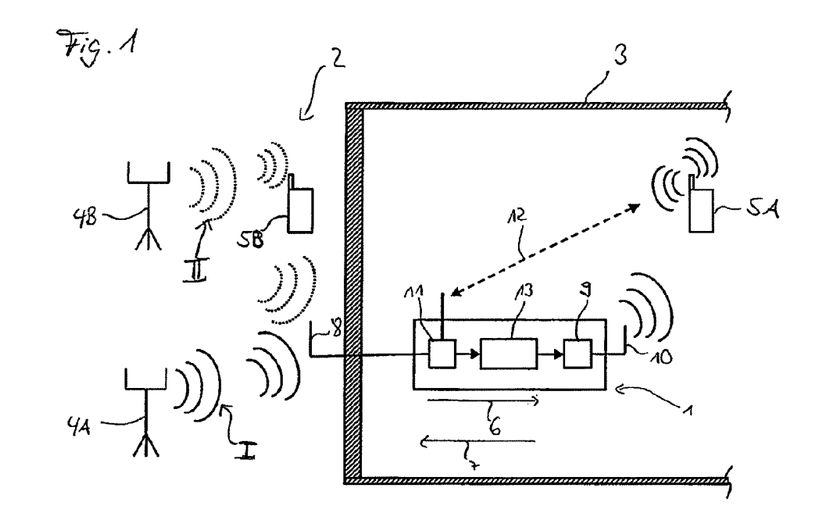
FIG. 1 shows a schematic illustration of the operation of a low-radiation repeater that is a multiband repeater according to one embodiment.

FIG. 1 depicts, in a simplified schematic illustration, one embodiment of a mode of operation of a low-radiation repeater 1, which is used within a mobile radio network 2 for transmitting communication signals to a building 3 (indicated roughly), which is usually in shadow for radio waves.

The mobile radio network 2 includes a plurality—two shown in this case—of base stations 4A and 4B (arranged outside the building 3) and also a plurality—again two shown in this case—of mobile radio terminals 5A and 5B which are situated inside and outside the building 3, respectively.

Within the mobile radio network 2, the communication signals can be transmitted on different frequency bands on the basis of various mobile radio standards. As an example, the first base station 4A, arranged at the bottom of FIG. 1, and the first mobile radio terminal 5A are in this case associated with a first mobile radio standard, for example GSM 900, corresponding to a first frequency band I (in this case 900 MHz), which is denoted by solid radio waves. The second base station 4B (at the top of FIG. 1) and also the second mobile radio terminal 5B are, by contrast, associated with a second mobile radio standard, for example UMTS 2100, corresponding to a second frequency band II (in this case 2100 MHz), which is denoted by dashed radio waves.

In the first embodiment provided in this case, the repeater 1 is in the form of a "multiband repeater", i.e. it is capable of transmitting the radio signals on different frequency bands I and II.

The repeater 1 can receive radio signals which come from the base stations 4A and 4B and transmit the radio signals in a "downlink direction" 6 (indicated by an arrow) inside the building 3. Conversely, the repeater 1 can receive radio signals which come from a mobile radio terminal situated in the building 3 and transmit the radio signals in an "uplink direction" 7 to one of the base stations 4A and 4B.

For transmitting the communication signals in the downlink direction 6, the repeater 1 can include an antenna 8 arranged outside on the building 2 for receiving the radio signals coming from the base stations 4A and 4B. In addition, the repeater 1 can include a transmitter 9 that broadcasts the radio signal (on both frequency bands I, II) inside the building 3, such as via an antenna 10.

In addition, the repeater 1 can include a sensor 11 that can use an uplink signal from a mobile radio terminal, for example to use a "location update signal," to identify the association between the mobile radio terminal and a particular mobile radio standard or a particular frequency band. In some embodiments, the uplink signal from a mobile radio terminal is used as a switching signal for the repeater. In the present example, the sensor 11 can detect the mobile radio terminal 5A and identify it as being associated with the frequency band I (indicated by the double-headed arrow 12).

The sensor 11 can be connected for signalling purposes to a control unit 13 in the repeater 1. The control unit can set the transmission power of the transmitter 9 on the basis of the signal from the sensor 11. In this case, the transmission power can be set to a value that is sufficiently high for interference-free transmission of communication signals. This setting is subsequently referred to as the "active operating state." Secondly, an operating state subsequently referred to as the "passive operating state" can be set, in which the transmission power can be set to a value which is reduced by 20 dB in comparison with the active operating state. In a "normal state," the transmitter 9 may be in the passive operating state and can be put into the active operating state only when required.

In accordance with some embodiments, the switching signal detected can be the uplink signal with the frequency band information from the mobile radio 5A. On the basis of this signal, the control unit 13 can put the transmitter 9 into the active operating state for the frequency band I, while signals on the frequency band II (no uplink signal detected) can be broadcast inside the building 3 only at very low transmission power. For the frequency band II, the transmitter 9 in this case can be in the passive operating state.

This first embodiment may be a comparatively easily implemented way of providing a low-radiation repeater.

Figure 2:
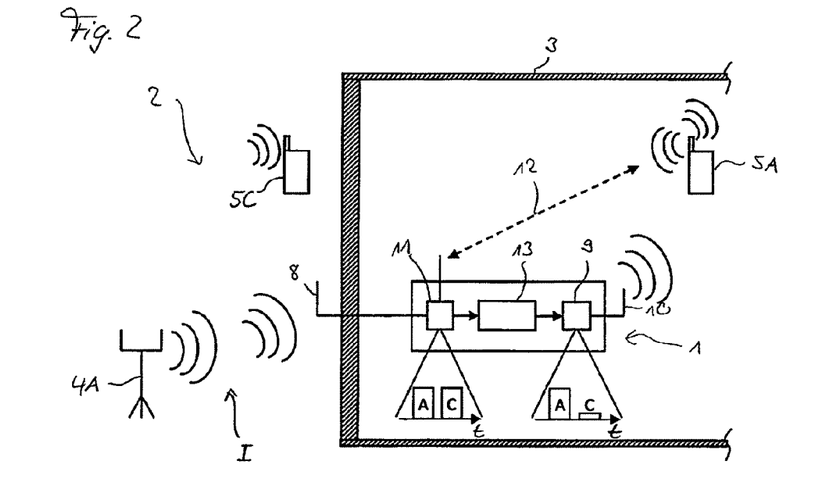
FIG. 2 shows an illustration based on FIG. 1 of a second embodiment of the repeater that is set up for time-division multiplexing.

FIG. 2 depicts a simplified schematic illustration of operating the repeater 1 in a second embodiment. In this embodiment, the repeater 1 may be a multiband repeater in accordance with the first embodiment. In particular, in this case the communication signals can be transmitted using a time-division multiplexing method. Accordingly, communication signals, which may be associated with different mobile radio terminals on the same frequency band, can be transmitted in temporally successive data packets in "time slices."

In the example shown in FIG. 2, the mobile radio terminal 5A can be situated inside the building 3, while a mobile radio terminal 5C can be situated outside the building 3. In contrast to the example shown in FIG. 1, however, both mobile radio terminals 5A and 5C can be in this case associated with the same mobile radio standard, for example GSM 900 with the associated frequency band I.

In contrast to the first exemplary embodiment, the communication signals from both mobile radio terminals 5A and 5C (accordingly on the same frequency band I thereof) may not be transmitted to the building 3. The reason is that in this case the sensor 11 can be additionally in the form of a decoder such that it can recognize the presence of a mobile radio terminal (again denoted by the double-headed arrow 12) and also decode and identify the association between the communication signals and the relevant mobile radio terminal 5A or 5C. In this case, the uplink signal can be again used as a switching signal and the communication signals themselves can be additionally provided as a switching signal. Again, the transmitter 9 in the normal state can be initially in the passive operating state.

In the present example, the sensor 11 can decode the communication signals to be transmitted by the repeater 1 and in so doing can identify the communication signals, schematically indicated as time slice A, as being associated with the mobile radio terminal 5A situated inside the building 3. By contrast, no mobile radio terminal can be associated with the communication signals from time slice C inside the building 3 (i.e. no uplink signal present as switching signal).

In this case, the control unit 13 can put the transmitter 9 into the active operating state or the passive operating state for individual time slices A and C—which are associated with the individual mobile radio terminals or communication signals. As indicated in the illustration, the transmitter 9 can broadcast the communication signals from time slice A at full transmission power (switching signal present, active operating state), while the communication signals from time slice C can be broadcast at a transmission power which is reduced by 20 dB (no switching signal present, passive operating state).

This embodiment of the repeater 1 can allow the electromagnetic radiation pollution inside the building 3 to be reduced even further (in comparison for example with the first embodiment).

Figure 3:
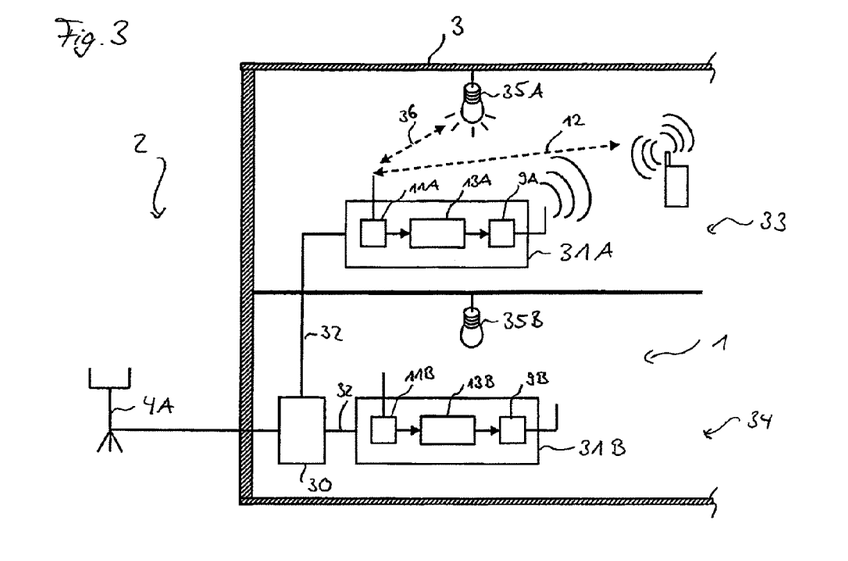
FIG. 3 shows an illustration based on FIG. 1 of a third embodiment of the repeater that is in the form of a "distributed antenna system".

FIG. 3 depicts the manner of operation of the repeater 1 in a third embodiment. In this case, the repeater 1 may generally again be designed in accordance with the first and/or the second embodiment. In particular, however, the repeater 1 in this case is in the form of a "distributed antenna system" (DAS) repeater. That is the repeater 1 in this case includes a master unit 30 which communicates with the base station 4A—in this case by wire. Secondly, the repeater 1 includes a plurality—two shown in this case—of remote units 31A and 31B that are designed for communication with a mobile radio terminal. Each of the remote units 31A, 31B can be connected for signalling purposes to the master unit 30 by means of a fiber-optic cable 32. In the example shown in the present case, the first remote unit 31A is arranged on a first story 33 of the building 3, while the second remote unit 31B is arranged on the ground floor 34.

In the present embodiment, each of the remote units 31A and 31B respectively includes a sensor 11A or 11B, a control unit 13A or 13B, and also a transmitter 9A or 9B. In this case, each sensor 11A or 11B, each control unit 13A or 13B and each transmitter 9A or 9B can be designed in a similar manner to the corresponding components of the repeater 1 based on one of the two previous embodiments.

In the present example, the mobile radio terminal 5A, which in this case is on the first story 33, is detected by the sensor 9A of the remote unit 31A from the uplink signal from said sensor, which in this case is used as a switching signal, so that the associated control unit 13A can broadcast the relevant communication signal via the transmitter 9A at full transmission power. Since the sensor 11B on the ground floor does not detect a mobile radio terminal (no switching signal), the transmission power of the transmitter 9B can be, or remains, reduced by the control unit 13B. This means that in this case the repeater 1 can be in the active operating state for the remote unit 31A, while it can be in the passive operating state for the remote unit 31B. The individual remote units 31A and 31B may normally be in the passive operating state and may be changed over to the active operating state only when a switching signal is detected.

In an alternative embodiment, the individual sensors 11A and 11B can be in the form of brightness sensors. In this case, the transmitters 9A and 9B can be in the active operating state when it is light, and put into the passive operating state when it is dark. This is illustrated by way of example by the lamps 35A on the first story 33 and 35B on the ground floor. In this case, the sensor 11A detects brightness, on the basis of the lamp 35A which is switched on, as a switching signal (indicated by the double-headed arrow 36), whereupon the control unit 13A can put the transmitter 9A into the active operating state. On the ground floor, the lamp 35B which is switched off means that no switching signal is detected, as a result of which the transmitter 9B can be operated in the passive operating state until a switching signal—brightness—is detected in this case too.

The embodiment shown in FIG. 3 can allow the radiation pollution for individual building parts to be adjusted according to need and hence reduced overall.

The embodiments shown in the present case have been chosen by way of example. Other combinations of repeaters of different design with the various switching signals are also conceivable.

LIST OF REFERENCE SYMBOLS

1 Repeater
2 Mobile radio network
3 Building
4A, 4B Base station
5A, 5B, 5C Mobile radio terminal
6 Downlink direction
7 Uplink direction
8 Antenna
9, 9A, 9B Transmitter
10, 10A, 10B Antenna
11, 11A, 11B Sensor
12 Double-headed arrow
13, 13A, 13B Control unit
30 Master unit
31A, 31B Remote unit
32 Fiber-optic cable
33 Ground floor
34 Story
35A, 35B Lamp
36 Double-headed arrow
A, C Time slice
I, II Frequency band

The invention claimed is:

1. A repeater for transmitting communication signals on different frequency bands in a radio transmission network, comprising:
   a transmitter configured to transmit the communication signals to a network terminal;
   a sensor configured for detecting switching signals for the different frequency bands such that each frequency band of the different frequency bands is associated with a switching signal; and
   a control unit configured to change the transmitter between a passive operating state and an active operating state for a frequency band based on the switching signal associated with the frequency band, wherein a transmission power of the transmitter is a non-zero level in the passive operating state and is lower in the passive operating state than in the active operating state, wherein the control unit is configured to operate the transmitter in the passive operating state at a passive operating transmission power that is reduced in dB in a range of 10 dB to 20 dB, as compared to an active operating transmission power of the active operating state.

2. The repeater of claim 1, wherein the sensor is configured to detect a radio signal as the switching signal, the radio signal being an uplink signal from the network terminal.

3. The repeater of claim 1, wherein the sensor comprises a decoder configured to detect the communication signals transmitted between a base station and the network terminal as the switching signals.

4. The repeater of claim 1, wherein the sensor is configured for detecting at least one of a light intensity, an audible signal, a movement, an acceleration, or a position.

5. The repeater of claim 1, further comprising:
a master unit; and
a plurality of remote units, each remote unit of the plurality of remote units being configured to communicate with the master unit and comprising a respective sensor for detecting the switching signal and a respective transmitter for transmitting the communication signals,
wherein the control unit is configured to change each respective transmitter between the passive operating state and the active operating state based on the respective switching signal separately.

6. The repeater of claim 1, wherein the repeater is a TDD repeater for asymmetric transmission, at alternate times, of the communication signals in an uplink direction from the network terminal to a base station and in a downlink direction from the base station to the network terminal,
wherein the control unit is configured to change the transmitter back into the passive operating state after changeover to the active operating state only after a hold time.

7. The repeater of claim 1, wherein the control unit is configured to operate the transmitter in the passive operating state at a passive operating transmission power that is a minimal transmission power for adequate communication signal recognition.

8. The repeater of claim 1, wherein the repeater is configured for transmitting communication signals to a building.

9. A method for operating a repeater for a radio transmission network, comprising:
transmitting communication signals on different frequency bands by a transmitter;
detecting separate switching signals for the different frequency bands;
selecting for each of the different frequency bands, based on a respective switching signal of the separate switching signals, one of an active operating state or a passive operating state; and
operating the transmitter in the repeater in the passive operating state at a passive operating transmission power that is reduced in dB in range of 10 dB to 20 dB, as compared to an active operating transmission power of the active operating state,
wherein the communication signals are transmitted at a non-zero level in the passive operating state and at a lower transmission power in the passive operating state than in the active operating state.

10. The method of claim 9, wherein the separate switching signals comprise radio signals that are uplink signals from a network terminal.

11. The method of claim 9, further comprising:
operating the transmitter of the repeater in the active operating state or the passive operating state, based on a switching signal that is the communication signals between a base station and a network terminal.

12. The method of claim 9, further comprising:
operating the transmitter in the repeater in at least one of the active operating state or the passive operating state, based on a switching signal that is at least one of a light intensity, an audible signal, a movement, an acceleration, or a position.

13. The method of claim 9, further comprising:
transmitting the communication signals using an asymmetric TDD method at alternate times in an uplink direction from a network terminal to a base station and in a downlink direction from the base station to the network terminal, wherein the transmitter is operated in the passive operating state again after the active operating state only after a hold time.

14. The method of claim 9, further comprising operating the transmitter in the repeater in the passive operating state at the passive operating transmission power that is a minimal transmission power for adequate communication signal recognition,
wherein operating the transmitter in the repeater in the passive operating state at the passive operating transmission power that is the minimal transmission power for adequate communication signal recognition comprises:
reducing the passive operating transmission power in dB in a range of 10 dB to 20 dB; and
responsive to detecting no switching signals in a waiting time, reducing the passive operating transmission power to the minimal transmission power.

15. A repeater for transmitting communication signals in a radio transmission network using time-division multiplexing in temporally successive time slices, comprising:
a transmitter configured to transmit the communication signals to a network terminal;
a sensor for detecting switching signals for the time slices;
a control unit configured to change the transmitter between a passive operating state and an active operating state based on at least one of the switching signals, wherein a transmission power of the transmitter is a non-zero level in the passive operating state and is lower in the passive operating state than in the active operating state,
wherein the control unit is configured to operate the transmitter in the passive operating state at a passive operating transmission power that is reduced in dB in a range of 10 dB to 20 dB, as compared to an active operating transmission power of the active operating state,
wherein the passive operating transmission power comprises a minimal transmission power for adequate communication signal recognition.

16. The repeater of claim 15, wherein the switching signals comprise at least one of:
a radio signal that is an uplink signal from the network terminal;
the communication signals transmitted between a base station and the network terminal;
a light intensity;
an audible signal;
a movement;
an acceleration; or
a position.

17. The repeater of claim 15, wherein the repeater is disposed in a distributed antenna system, the distributed antenna system comprising:
a master unit; and
a plurality of remote units, each remote unit of the plurality of remote units being configured to communicate with the master unit.

18. The repeater of claim 15, wherein the repeater is a TDD repeater for asymmetric transmission, at alternate times, of the communication signals in an uplink direction from the network terminal to a base station and in a downlink direction from the base station to the network terminal,
wherein the control unit is configured to change the transmitter back into the passive operating state after changeover to the active operating state only after a hold time.

19. A method for operating a repeater for a radio transmission network, comprising:
   transmitting communication signals using time-division multiplexing in temporally sequentially successive time slices;
   separately detecting a switching signal for each time slice;
   operating a transmitter in the repeater for a time slice in one of an active operating state or a passive operating state, based on the switching signal for the time slice; and
   operating the transmitter in the passive operating state at a passive operating transmission power that is reduced in dB in range of 10 dB to 20 dB, as compared to an active operating transmission power of the active operating state,
   wherein the communication signals are transmitted at a non-zero level in the passive operating state and at a lower transmission power in the passive operating state than in the active operating state.

20. The method of claim 19, wherein the switching signal comprises at least one of:
   a radio signal that is an uplink signal from a network terminal;
   the communication signals;
   a light intensity;
   an audible signal;
   a movement;
   an acceleration; or
   a position.

21. The method of claim 19, further comprising:
   transmitting the communication signals using an asymmetric TDD method at alternate times in an uplink direction from a network terminal to a base station and in a downlink direction from the base station to the network terminal, wherein the transmitter is operated in the passive operating state again after the active operating state only after a hold time.

22. The method of claim 19, further comprising:
   responsive to detecting no switching signals in a waiting time, reducing the passive operating transmission power to a minimal transmission power for adequate communication signal recognition.

* * * * *